2 Sheets--Sheet 1.

C. H. WILLIAMS.
Dies for Welding Links.

No. 147,460. Patented Feb. 10, 1874.

Witnesses:
Edwin James.
K. V. Gordon.

Inventor:
Charles H. Williams
per J. E. H. Holmead
Attorney.

2 Sheets--Sheet 2.
C. H. WILLIAMS.
Dies for Welding Links.
No. 147,460. Patented Feb. 10, 1874.
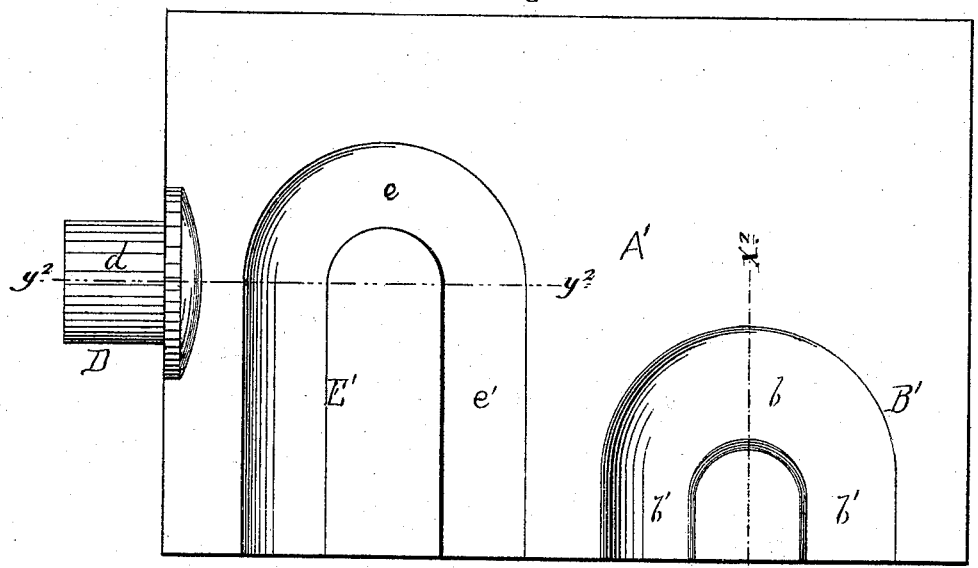
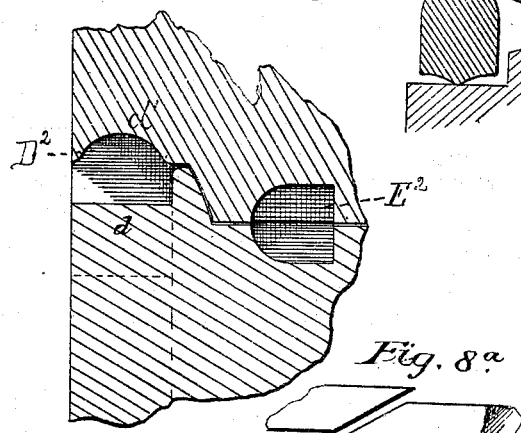
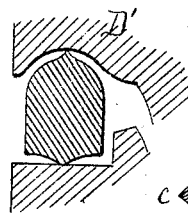
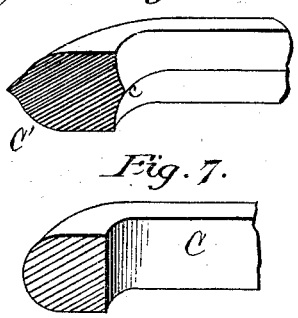
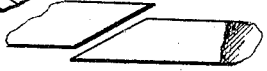
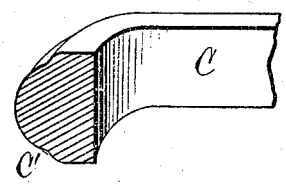
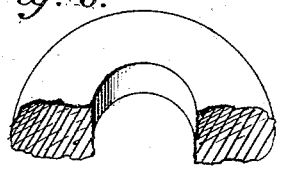
Witnesses:
Edwin James.
K. V. Gordon.
Inventor:
Charles H. Williams
per J. E. H. Holmead
Attorney.
AM. PHOTO-LITHOGRAPHIC CO. N.Y. (OSBORNE'S PROCESS)

UNITED STATES PATENT OFFICE.

CHARLES H. WILLIAMS, OF CLEVELAND, OHIO.

IMPROVEMENT IN DIES FOR WELDING LINKS.

Specification forming part of Letters Patent No. 147,460, dated February 10, 1874; application filed December 1, 1873.

*To all whom it may concern:*

Be it known that I, CHARLES H. WILLIAMS, of Cleveland, in the county of Cuyahoga and State of Ohio, have invented certain Improvements in Dies for Welding Links, of which the following is a full, clear, and exact description, reference being had to the accompanying drawing and the letters of reference marked thereon, making part of this specification, in which—

Figure 1:
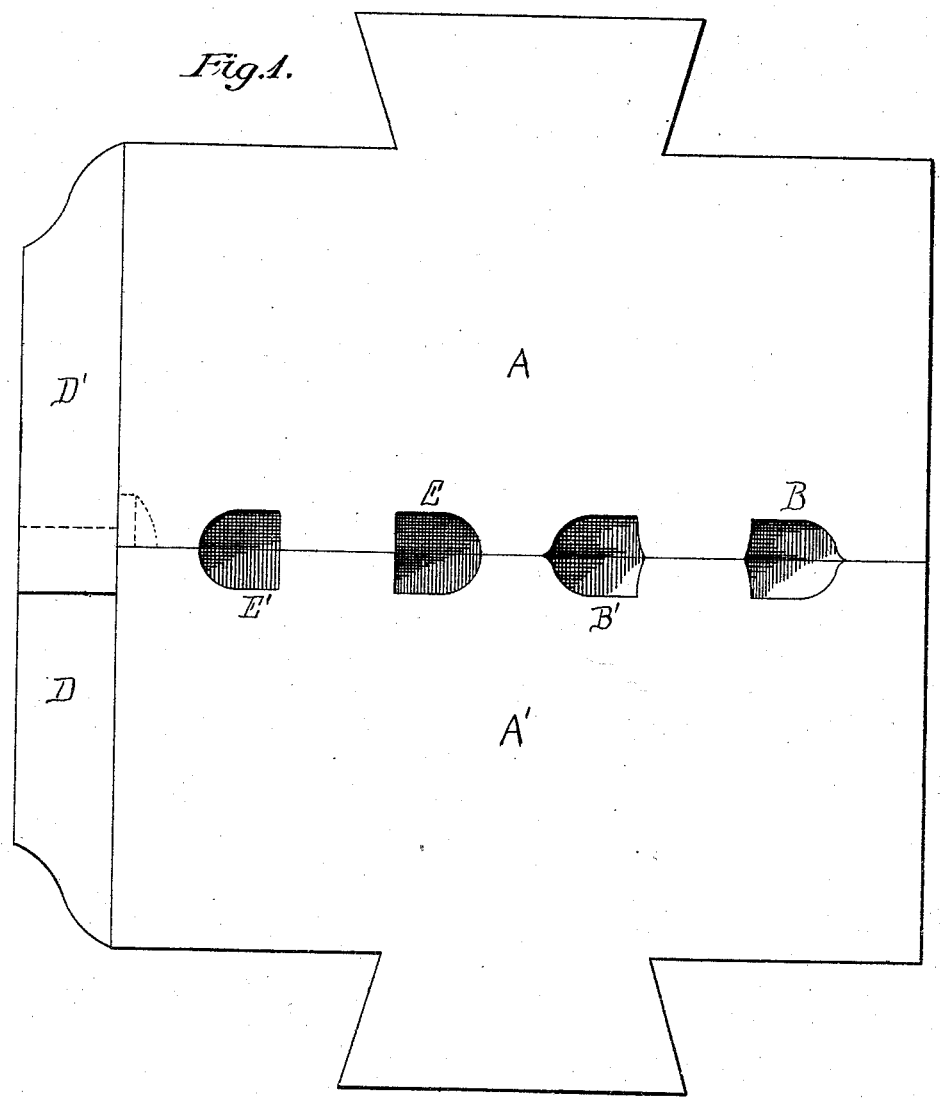
Figure 2:
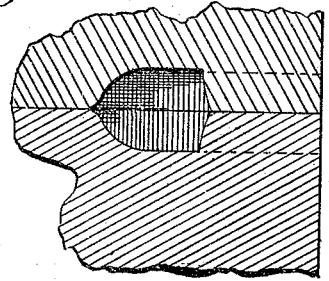

Figure 1 is an elevation of a set of dies to form the angular link. Fig. 2 is a detailed sectional view on the line $x^2\ x^2$, Fig. 3. Fig. 3 is a face or plan view of one of the dies, illustrating the three operations to form the angular link. Fig. 4 is a sectional view on the line $y^2\ y^2$, Fig. 3. Fig. 5 is a segment of link, showing the first operation. Fig. 6 is a segment of link, showing the second operation. Fig. 7 is a segment of link, showing the third operation. Figs. 8 and $8^a$ show the manner of welding the link. Fig. 9 is a vertical sectional view of the projecting and female cap-dies.

My present improvement in welding railroad-car coupling-links is substantially the same in principle as the invention embraced in an application for Letters Patent of the United States filed by me on November 24, 1873, with this difference, however, that while the series of cavities or sets of dies embraced in the application referred to are designed to weld a link formed from the ordinary round bar of iron, my present invention is designed, through the action of a set or series of hammer or pressure dies, to weld car-coupling links which have been bent or formed from a bar having rectangular edges or square. The nature of my invention consists in constructing the first of the series of dies or cavities with curved flaring grooves, the same being of such form as not only to readily receive and accommodate a bar of metal having rectangular edges, but also to allow of the natural spread of the metal during the process of welding, and at that section of the link which it is desired to weld. From the ends of this flaring curved section or arc of the grooves extend parallel grooves. These grooves are to be of such contour or form as to receive and inclose the parallel sides of the link, and should extend toward the front face of the die on the same plane with the curved section, instead of running at positive angles of inclination, as in my application before referred to. If, however, the dies are cut away at all so as to gradually deepen the grooves toward the face of the die, it will readily be seen that their angle of inclination must be exceedingly slight, owing to the form of the bar to be worked; otherwise the original shape of the link at its welded section will not be preserved, and a link irregular in form will be the result. In welding a square or rectangular-edged bar a broad flat lap is provided at the scarfed ends of the link, and which, owing to its form, is most readily and almost instantaneously closed or welded through the action of these, the first of the series of dies, and which permits of the link being removed and transferred to a projecting die or former, and there to be worked through the action of said die and a movable female cap-die, while still at a welding heat. The latter die is of precisely the same form as the female cap-die in my former application, as the outer surface of the link is desired to be of the same curved contour, whether made from a round bar or a bar having rectangular edges; but the projecting die or former is different from the corresponding die in my former application, as it is not recessed, but flat, throughout its entire curved and parallel sections, and is designed to conform to the flat interior surface of the link. These dies perform the second stage of my process of forming the perfectly welded and finished link, and their function is twofold. Instead of simply reducing the lateral spread of metal, and leaving it expanded in an opposite direction so as to be the more readily acted on by the finishing-dies, they also, during the same operation and at one and the same time, drive or tuck in the fins which may have been developed by the action of the first of the series of dies or cavities. The great advantage of this arrangement is that the projecting and female dies are thus enabled to perform their double function on the link while the metal is still at a welding heat. The second stage of my process having been thus completed and the fins having been all driven in, and the lateral swell at the welded section of the link having been reduced and the metal spread in the opposite direction, the link is now subjected to the action of the finishing-dies, whose cavities are of such form that when they are brought together they shall form a closed groove or recess, which, throughout its entire surface, is of the dimensions of the original bar and of the precise form and contour of the sections of the finished link which they are designed to inclose.

The construction and operation of my invention are as follows:

A is the upper and A' the lower die-block. These die-blocks are constructed of any suitable material, and are arranged and secured on any suitable machine and driven by any desired motor, so as to operate in the usual manner. The upper die-block A is always movable, while the lower one A' may be stationary, or, if desired, so secured and arranged on the machine as to allow of its having a movement corresponding or similar to that of the die-block A. In the accompanying drawing, the upper of the three sets of dies which compose the system or series which I employ in welding and finishing the car-coupling link are arranged or united in the die-block A, while the lower of the three sets of dies or die-cavities are provided or formed, as it were, in a single die-block, A'. While this arrangement is exceedingly convenient, I desire it distinctly understood that there is nothing arbitrary about the same, for, if preferred, each set of dies may be formed on distinct and independent blocks, as in either case their action and operation are precisely the same. The first of these series of dies or die-cavities B B' cut in the faces of the die-blocks A A' are counterparts of each other, and are of the general form and outline shown in Figs. 2 and 3, each consisting of a curved groove, b, and straight parallel grooves b' b'. The curved groove or section b of each cavity is flaring and is of such form and dimensions as to receive and secure the open sections of the link and to allow of the natural spread of the metal, and which is positively essential in order to secure a perfect weld. The straight grooves or sections b' b' of these cavities run parallel to each other, extending from the ends of the curve or arc b toward the front face of the die. The form and dimensions of these latter grooves are such that when the dies are brought together they form an inclosed groove of precisely the contour of the square or rectangular edged bar, which has been bent so as to form the link. In the grooves b' b' on the lower die-block A rests a portion of the parallel sides of the link while its open ends are being welded and caused to conform to the contour of the grooves b b through the action of the dies. Thus it will be seen, owing to the form of these grooves b b and b' b', that while in operation a natural spread of the metal is provided for at the section of the link which is to be welded, the form of the sections of the sides of the link, which rest in the grooves b' b', is in no manner altered or changed, they being, after the process is finished, of the same form as was the original bar which was bent to form the link. The base or lower sections of the grooves b b and b' b' are in the same plane, which causes the link to lie in a true horizontal position during the process of welding; but, in case it should be desired to cut these parallel grooves b' b' at an angle of inclination, as in my application hereinbefore referred to, it will be readily understood that the angle of deflection must be exceedingly slight, owing to the form of the square or rectangular edged bar, which the cavities B B' are designed to weld, otherwise the shape of the link at its welded section will not be preserved, and a link irregular in form will be the result. But it is not my present intention in this case, as in my former application, to drive in the fins, which are, almost invariably, developed on the lateral faces of the link during the process of welding, through the action of these, the first set of cavities, or at the first stage of the process; nor is it at all necessary that I should do so. The bar being square, or having rectangular edges, instead of being round, the projecting die used in the second stage of my process is of such form that, in connection with the female cap-die, while the lateral spread of metal is being reduced, and the link swelled in the the opposite direction for the action of the finishing-dies, the fins are by one and the same operation driven in.

The operation of the first of these series of dies or die-cavities B B' will be readily understood. The square or rectangular section of the bar or blank which is designed to form the link having been bent through the action of a suitable mandrel or former, the ends of the link to be welded will have a curved form, as shown at Fig. 8, its ends being scarfed and lapping, as shown at Fig. 8ª. The link is then placed in a suitable furnace and heated to a welding heat. It is then withdrawn, and the upper die-block A being elevated, the link is placed in the die B' of the die-block A'. Its curved and scarfed ends are placed in the flaring section b of the cavity, while the sections of its parallel sides rest in the grooves b' b'. Motion being now imparted to the die-block A, the link is almost instantaneously welded through its action, the broad flat lap, which the form of the bar leaves at the scarfed ends of the link, tending greatly to facilitate the operation. The link now having been welded by the hammering or pressure of the dies, and the flaring or oval groove formed by the sections b b of the cavities B B' being such as to allow of the natural spread of the metal, the link C, at its welded section, is of the form shown at C', Fig. 5, having fins c c developed or thrown out on its lateral faces. The action of the dies in welding being so rapid, and almost instantaneous, the metal, during the process, has no chance to cool. So, while still at a welding heat, the link is removed and transferred to the projecting die or former D. This die has a flat curved head and straight parallel sides. The curved section $d$ of this die, in connection with the groove $d'$ of the female cap-die $D^1$, and which, as has been said, is a counterpart of the corresponding die in my former application, provide, when they meet, such a cavity as is shown at $D^2$, Fig. 4. The welded link C is now placed over the projecting die D, its spread-welded section $C'$ encircling its curved section $d$, one of the fins $c$ being directly at the center of said curve $d$, and the other fin $c$ being in position to be struck by the center of the groove of the cap-die $D^1$, as shown at Fig. 9. Motion being imparted to the female die $D^1$ through its action the spread-welded section $C'$ of the link C, Fig. 5, is caused to assume the form of the cavity $D^2$, Fig. 4, and which reduces the lateral spread at the welded section of the link, causing it to swell out in the opposite direction, leaving the section $C'$ of the link C of the form shown at Fig. 6.

This action of the dies D $D^1$ thus not only changes the form of the spread of the welded sections of the link, but also drives or tucks in the fins $c\ c$, and this, too, while the metal is still at a welding heat, and which is absolutely necessary; otherwise the driving in of the fin is a positive detriment, for if driven in while cold, it being harder than the welded metal, its inevitable tendency is to part or injure the already welded section of the link.

The groove $d'$ of the female cap-die $D^1$, being curved, fits directly over the head of the die D, its lower edges, or the outer sections of its curve, just passing beyond the arc of the link, and which guards against all danger of the sides of the link bulging out under the action of the die, no matter how great its force or pressure in operation may be, as the female cap-die at each blow, as it were, clamps the sides of the link, causing them to adhere to the parallel sides of the former.

Thus, it will be seen that these dies, in addition to reducing the lateral spread at $C'$, and driving in the fins $c\ c$, Fig. 5, in reality perfects the weld and secures a better link in every respect than any number of blows, or any amount of labor, can effect in the hand-made link.

This section stage of the process being now completed, and the welded section $C'$ of the link being of the form shown at $C'$, Fig. 6, the link is removed and subjected to the action of the finishing-dies E $E^1$, Figs. 1 and 3. These dies are counterparts of each other, and their cavities, when brought together, form a closed groove, $E^2$, which is of uniform dimensions throughout, having its inner edge straight, and its outer surface curved, so as to conform precisely to the shape of the metal, and of the precise form and contour of the link when finished. The die E being elevated, the link is placed in the cavities of the die, the sides of the link exactly fitting in the groove $e'$, while the section $C'$, Fig. 6, of the link is, through the action of the dies, soon caused to conform to the shape of the grooves $e\ e$, and which leaves the link uniform throughout. This finishes the operation, and enables me to do, through the action of dies, what, invariably, heretofore has only been done by hand—i. e., to weld a perfect and finished link from a bar of iron which is square, or has rectangular edges.

What I claim as new, and desire to secure by Letters Patent of the United States, is—

1. The combination of the projecting anvil-die D and hammer-die $D^1$, when constructed of the form or shape described and shown— that is to say, the former with straight vertical sides, and with upper surface rounded in the direction to correspond to the bend of the link, but straight in a direction at right angles thereto, while the latter is curved concavely, both in the direction of the bend of the link and in direction at right angles thereto.

2. The dies B $B'$, curved in the form of a link, and in cross-section approximating to the shape of the iron—that is to say, the portion that forms the inner face of the link formed nearly straight and at right angles to the bottom of the groove, and that portion of the groove corresponding to the outer face of the link being curved or concave—the walls of the dies or grooves where they meet the surface flaring out to allow the metal to spread and form a fin.

3. The combination of the dies B $B'$, E $E^1$, and D $D^1$, when constructed of the form herein shown and described.

In testimony whereof I have signed my name to this specification in the presence of two subscribing witnesses.

CHAS. H. WILLIAMS.

Witnesses:
 EDWIN JAMES,
 JOS. T. K. PLANT.